United States Patent [19]

Wilson et al.

[11] 4,187,817

[45] Feb. 12, 1980

[54] APPARATUS AND METHOD FOR AVERTING THE EFFECTS OF SEAL FAILURE IN AN I.C. ENGINE FUEL SUPPLY SYSTEM

[75] Inventors: Harry L. Wilson; David E. Shultz; George L. Muntean, all of Columbus, Ind.

[73] Assignee: Cummins Engine Company, Inc., Columbus, Ind.

[21] Appl. No.: 948,872

[22] Filed: Oct. 5, 1978

[51] Int. Cl.[2] .................. F02M 39/00; F02D 1/04; F02B 77/00; F16K 31/365

[52] U.S. Cl. .................. 123/139 AW; 123/140 MP; 123/198 DB; 251/61.4; 137/312

[58] Field of Search .................. 123/140 MP, 140 FG, 123/139 AW, 140 R, 198 D, 198 DB; 92/13.2; 137/217, 519.5, 312, 460; 251/61.4

[56] References Cited

U.S. PATENT DOCUMENTS

| | | | |
|---|---|---|---|
| 2,552,960 | 5/1951 | Grieshaber | 137/312 |
| 3,084,901 | 4/1963 | Thorburn | 251/61.4 |
| 3,241,805 | 3/1966 | Schumann | 251/61.4 |
| 3,450,206 | 6/1969 | Watkins | 137/519.5 |
| 3,805,760 | 4/1974 | Yagi | 123/198 DB |
| 3,868,890 | 3/1975 | Roberts | 137/312 |
| 3,896,843 | 7/1975 | Millar | 251/61.4 |
| 3,945,302 | 3/1976 | Downs | 92/13.2 |
| 4,054,116 | 10/1977 | Coddington | 123/198 DB |
| 4,059,088 | 11/1977 | Tateno | 123/198 DB |
| 4,095,572 | 6/1978 | Scholtz | 123/140 MP |

FOREIGN PATENT DOCUMENTS

| | | | |
|---|---|---|---|
| 526257 | of 1894 | United Kingdom | 137/519.5 |

*Primary Examiner*—Charles J. Myhre
*Assistant Examiner*—Carl Stuart Miller
*Attorney, Agent, or Firm*—Sixbey, Friedman & Leedom

[57] ABSTRACT

An air fuel ratio control for an I.C. engine fuel supply system is disclosed including a diaphragm operator for a fuel flow modulating valve responsive to engine intake manifold pressure as sensed through an air line connecting the diaphragm operator with the intake manifold and a drain line for returning to the engine fuel tank all fuel which may leak into the diaphragm operator due to seal rupture. The disclosed system further including a specially designed flow restrictor in the air line to prevent engine fuel tank pressurization and reverse fuel flow into the engine's intake manifold should the diaphragm operator rupture. The flow restrictor includes a control orifice which is sufficiently large to allow proper control by the diaphragm operator but yet not so large as to allow fuel tank pressurization should the diaphram rupture. In one embodiment the flow restrictor includes a check valve designed to close only upon improper fuel flow from the air fuel control to the intake manifold. To avoid manufacturing tolerances, the check valve may be calibrated to close at precisely the proper miminal flow rate.

23 Claims, 7 Drawing Figures

FIG. 4
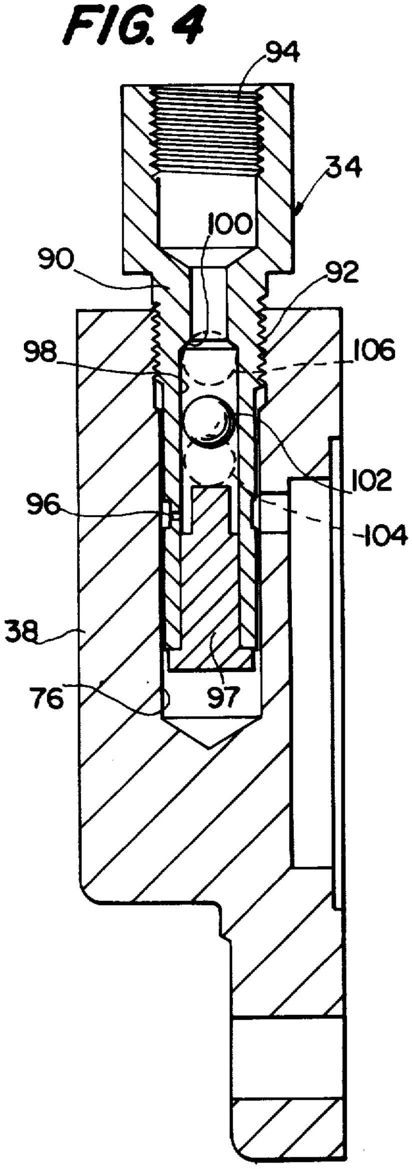
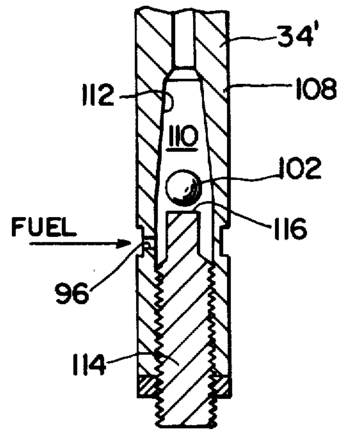
FIG. 5
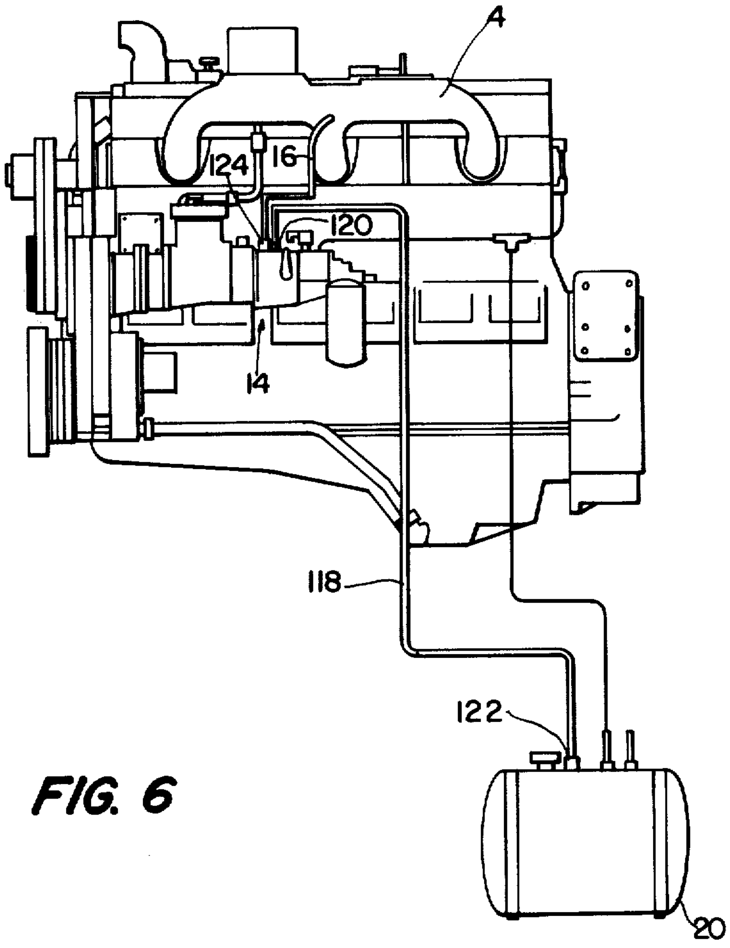
FIG. 6

APPARATUS AND METHOD FOR AVERTING THE EFFECTS OF SEAL FAILURE IN AN I.C. ENGINE FUEL SUPPLY SYSTEM

BACKGROUND OF THE INVENTION (1) Field of the Invention

This invention relates to the field of pressure controlled fuel supply systems for internal combustion engines which are operationally controlled by variations in the pressure of fuel supplied to the engine.

(2) Discussion of the Prior Art

Extensive commerical application has been made of fuel systems for internal combustion engines operationally controlled by variations in the pressure of fuel supplied to the engine especially of fuel systems for compression ignition (diesel type) engines such as illustrated in U.S. Pat. Nos. 3,139,875 and 3,385,276. All such systems include a source of fuel under pressure, e.g. a fuel pump, and a mechanism for regulating the fuel pressure supplied to each cylinder. To achieve optimum fuel/air ratios under all operating conditions, highly sophisticated refinements have been made in these basic components to permit a carefully scheduled pressure output as a function of operator demand and engine speed.

One particularly important recent refinement has been the provision of a diaphram controlled operator responsive to intake manifold pressure to modulate fuel flow to the engine during operating conditions in which the intake manifold is below rated pressure. Thus, by carefully controlling the amount of fuel metered into each cylinder of an engine dependent in part upon the air pressure within the engine's intake manifold, it is possible to more accurately control the ratio of fuel to air in the gaseous mixture fed to the engine's cylinders. Such refined control is especially desirable in supercharged engines wherein the fuel air ratio received in each cylinder may otherwise become seriously imbalanced under certain operating conditions such as startup and acceleration. One such device for achieving this result is illustrated in U.S. Pat. No. 3,945,302 wherein a diaphragm operated valve is disclosed for connection in the fuel line between the engine fuel pump and the engine cylinders. An air pressure line is connected between the intake manifold and one side of the diaphragm which is biased by a spring selected and calibrated to provide modulation of the valve restriction to vary the fuel pressure in response to intake manifold pressure whereby the optimum air/fuel ratio can be maintained over a broad range of operating conditions.

Practical experience with the diaphragm operated valve of U.S. Pat. No. 3,945,302 has shown that this valve is particularly susceptible to fuel leakage around the stem connecting the valve plunger to the diaphragm. While the problem can generally be traced to dirt within the seal area, better filtration to keep the dirt out of the seal area has only been partially successful in eliminating the leakage problem.

In addition to leakage, fuel supply systems of the type disclosed in U.S. Pat. Nos. 3,139,875 and 3,385,276 are also susceptible to improper tampering thereby adversely affecting fuel economy and long term durability. In particular, fuel systems of the type noted are generally provided with a drain line to the fuel tank for returning fuel which is not injected into the engine cylinders or which is bleed from the gear pump section of the fuel pump. Users of engines equipped with such fuel systems have discovered that the engine's short term power output can be increased by clamping the drain line. The effects of such unauthorized modification can be extremely adverse including loss of fuel economy and shortened engine life. Numerous attempts have been made to thwart such intentional drain line blockage with varying degrees of success. For example, U.S. Pat. Nos. 3,741,182 and 4,062,336 disclose anti-tampering fuel control devices for fuel systems for the type disclosed above but these devices have still not presented an ideal solution since added expense and complexity are involved in the application of these inventions to known fuel pressure regulation systems.

In the flow regulating valve art generally, it is known to design a check valve for permiting air flow in one direction but preventing liquid flow in the opposite direction as illustrated in U.S. Pat. No. 2,039,109. It is also know to provide a check valve with an adjustment feature to permit adjustment in the flow rate at which the valve will close as illustrated in U.S. Pat. No. 3,450,206. However, neither of these patents suggests a manner by which the above noted problems peculiar to fuel supply systems for internal conbustion engines could be solved.

SUMMARY OF THE INVENTION

The basic purpose of the subject invention is to provide method and apparatus for overcoming the deficiencies of the prior art as noted above by providing a fuel supply system for an internal combustion engine including an air fuel control responsive to intake manifold pressure of the engine to modulate the fuel supply while at the same time avoiding the adverse effects caused by fuel leakge within the air fuel control mechanism.

In accordance with a more specific object of this invention, an air fuel control mechansim is provided for modulating the fuel supplied to an internal combustion engine wherein the air fuel control mechanism is modified to avoid the adverse effects of fuel leakage by the provision of a drain line connected between the air fuel control mechanism and the fuel tank of the engine. To avoid the possibility of fuel injection directly into the intake manifold from the air fuel control mechanism, a specially designed fuel check valve is placed in the air line connecting the intake manifold with the air fuel control mechanism wherein the check valve imposes no restriction in the flow of air to and from the intake manifold but is designed to close immediately upon fuel flow in the air line.

Since internal combustion engines operationally controlled by the pressure of fuel supplied thereto are often equipped with a return line from the engine back to the fuel supply, the drain line of the air fuel control mechanism may be spliced into this return line to provide a flow path for the leakage fuel and at the same time reduce the flow of fuel to the engine should the return line be clamped in an unauthorized manner. This benefit of the subject invention derives from the fact that pressure in the drain line has the effect of forcing the air fuel control mechanism toward a position in which the flow of fuel to the engine is severely restricted.

It is another object of the subject invention to provide a repair kit for retrofitting previously existing engines operationally controlled by the pressure of fuel supplied thereto and equipped with an air fuel control mechanism susceptible to fuel leakage in a manner to avoid the adverse effects of such fuel leakage and to avoid the detrimental effects and possibly dangerous condition resulting from the injection of fuel into the intake manifold should the drain line from the air fuel control mechanism be blocked. In particular, the repair kit would include a drain line having first and second connectors at each end for attaching the drain line to the air fuel control mechanism and the engine fuel tank, respectively, and a fuel check valve adapted to be connected in the air line between the air fuel control mechanism and the engine intake manifold in order to prevent the flow of fuel from the air fuel control mechanism to the intake manifold.

Still other and more specific objects of this invention can be appreciated by consideration of the following description of the preferred embodiments.

BRIEF SUMMARY OF THE DRAWINGS

FIG. 4 is a cross-sectional view of the air fuel control cover taken along line 4—4 of FIG. 3*a* illustrating a check valve arranged to prevent fuel flow into the intake manifold of the internal combustion engine, FIG. 5 is a cross-sectional view of an alternative embodiment of the check valve illustrated in FIG. 4, and FIG. 6 is a side elevational view of an internal combustion engine retrofitted with a fuel supply system designed in accordance with the subject invention.

DETAILED DISCUSSION OF THE PREFERRED EMBODIMENT

Figure 1:
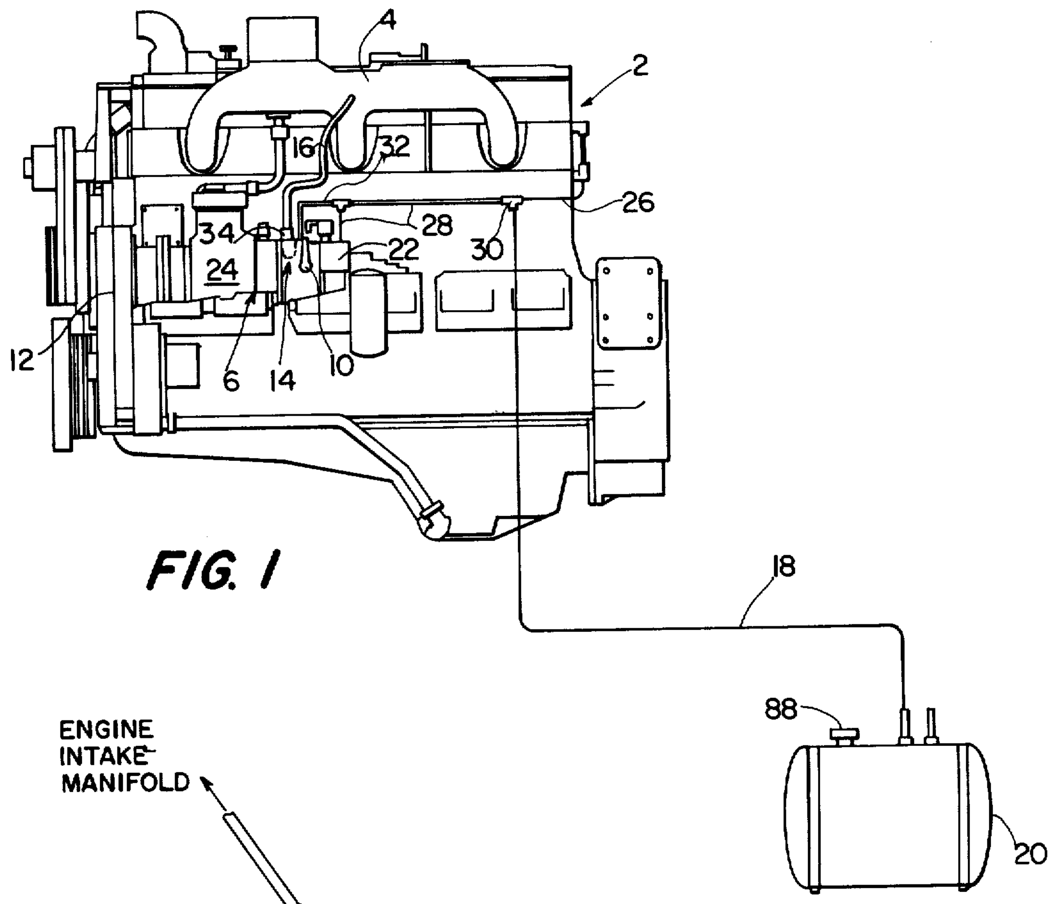
FIG. 1 is a side elevational view of an internal combustion engine equipped with a fuel supply system designed in accordance with the subject invention.

With reference to FIG. 1, a compression ignition internal combustion engine 2 is illustrated including an intake manifold 4 and a fuel supply system, shown generally at 6. Engine 2 is of the type which is controlled by the pressure of fuel supplied thereto by the fuel supply system 6. In particular, engine 2 includes a plurality of cylinders into which fuel is injected by injectors (not illustrated) synchronously actuated with the movement of the engine pistons, respectively. The amount of fuel actually injected into each cylinder is dependent on the pressure supplied to the common line by the fuel supply system which, in turn, is determined by a scheduled pressure output as a function of operator demand, indicated by the position of throttle lever 10, and as a function of the engine RPM. The fuel supply system 6 is connected to the engine crankshaft by a gear train 12.

In order to achieve more accurate air/fuel ratio control within each engine cylinder, the fuel supply system 6 includes an air fuel control 14 (described in more detail below) for modulating mechanically the flow of fuel into the engine 2 in response to the pressure of the air intake manifold 4. This capability is particularly important in turbo charged engines where the intake manifold pressure may fall below the rated pressure under certain operating conditions such as start up and acceleration. As will be explained more fully hereinbelow, the air fuel control 14, which operates as an air pressure responsive means, is connected with the intake manifold 4 through an air line 16.

As is common in fuel supply systems of the type illustrated in FIG. 1, a return line 18 is provided between the engine and the fuel tank 20 to provide a path for returning fuel which is sent to, but not injected into, the engine cylinders or which is bled from the gear pump section 22 of the fuel pump 24. The fuel returning from the injectors is connected to return line 18 through branch 26 and the fuel bleed from gear pump section 22 is connected to return line 18 by branches 28. Branches 26 and 28 are connected with return line 18 by the Tee connector 30.

In order to remove fuel resulting from leakage within the air fuel control 14, a drain line 32 is provided between the air fuel control 14 and branches 28 to form a flow path from the air fuel control 14 back to the fuel tank 20. A flow restriction 34 is provided between the connection of air line 16 and the air fuel control 14 in order to limit the upper rate at which air may flow from the intake manifold into the air fuel control 14 and to prevent the back flow of fuel in any substantial amount from the air fuel control 14 into the intake manifold 4. The precise design of flow restriction 34 will be discussed in greater detail hereinbelow.

Figure 2:
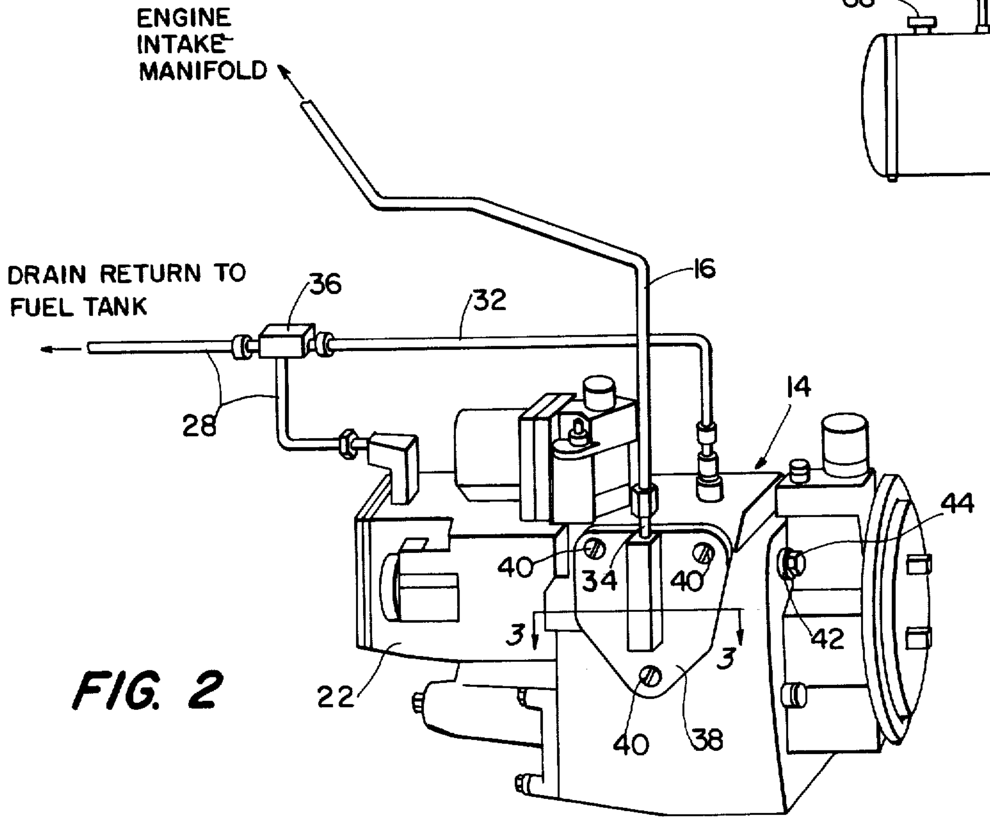
FIG. 2 is a perspective view of a modified air fuel control for modulating fuel flow to the engine in response to the air pressure within the intake manifold of the engine.

Referring now to FIG. 2, the air fuel control 14 and related portions of the fuel supply system are illustrated in perspective view. In particular, the air fuel control 14 is shown as connected to air line 16 by means of flow restriction 34 and the drain line 32 is connected at one end to the air fuel control 14 and at the other end to branches 28 by means of a Tee connector 36. The view illustrated in FIG. 2 is of the back side of the air fuel control 14 and related structure as illustrated in FIG. 1. This view illustrates the cover plate 38 connected to the air fuel control 14 by screws 40. The view in FIG. 2 also discloses a seal washer 42 on the front cover cap screw 44 which is designed to seal off fuel leakage through the conventional vent from the inside of the air fuel control 14.

Figure 3A:
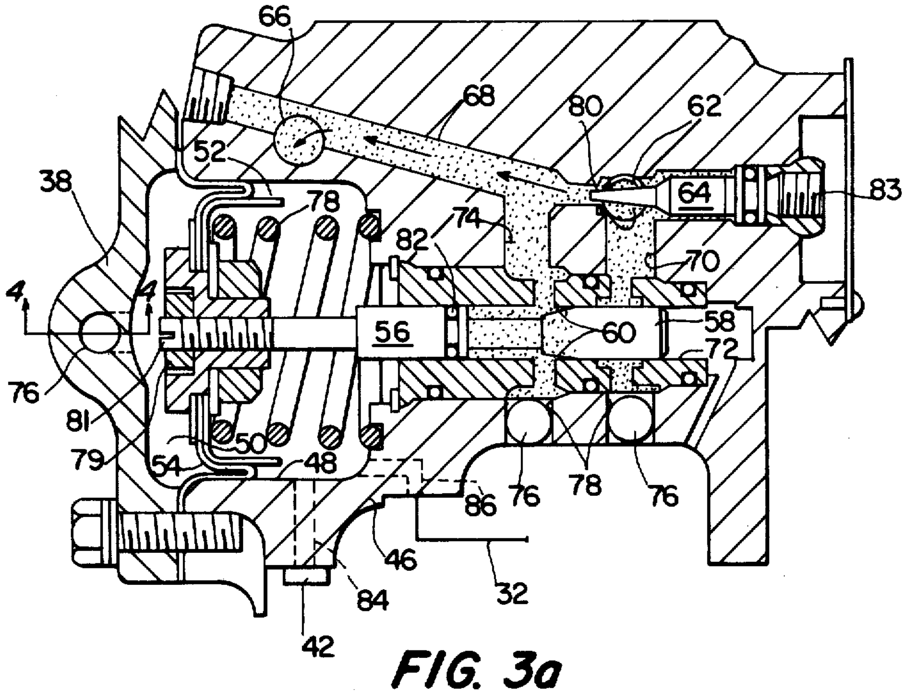
FIGS. 3*a* and 3*b* are cross-sectional views of the air fuel control illustrated in FIG. 2 taken along lines 3—3, with FIG. 3*a* illustrating low manifold pressure operation and FIG. 3*b* illustrating rated manifold pressure operation.
Figure 3B:
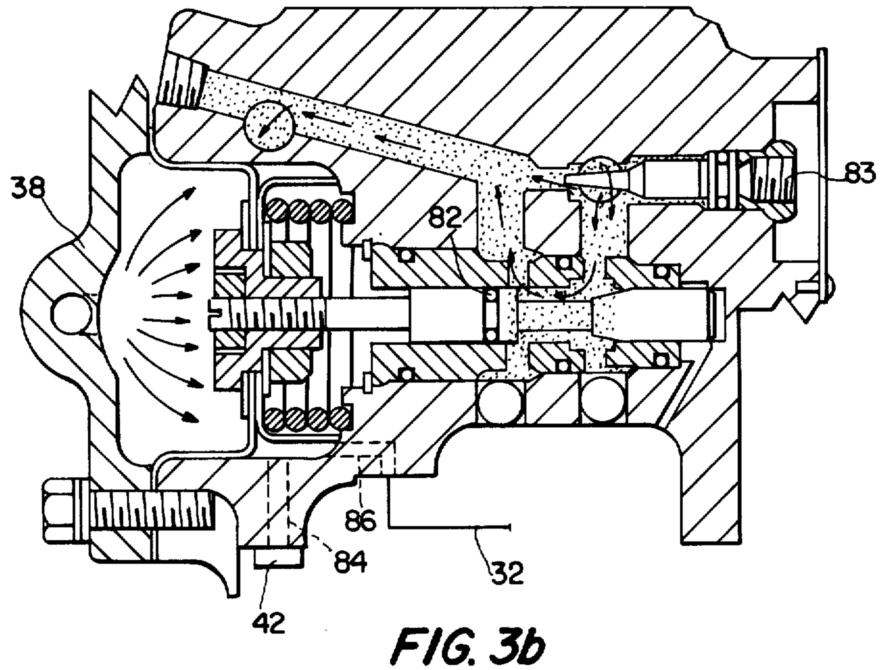

In order to understand fully the subject invention, it is necessary to describe the operation of the air fuel control 14 and the manner by which it operates to modulate the flow of fuel provided to an internal combustion engine in response to the pressure within the intake manifold of the engine. For this purpose, reference is made now to FIGS. 3*a* and 3*b* which illustrate a cross sectional view of the air fuel control 14 taken along line 3—3 of FIG. 2. FIG. 3*a* illustrates the condition of the air fuel control during a "no air" condition, that is, when the pressure within the intake manifold is below the rated pressure level. FIG. 3*b* illustrates the condition of the air fuel control 14 when the pressure within the intake manifold has reached its full rated level.

Referring now more specifically to FIG. 3*a*, the air fuel control 14 includes a housing 46 containing a control chamber 48 subdivided into a first chamber 50 and a second chamber 52 by a flexible bellows or diaphragm 54. One end of a stem valve 56 is connected with the flexible bellows while the other end of the stem 56 is provided with a plunger 58 having a chamfer surface 60, the purpose of which will be described hereinbelow. When in the position illustrated in FIG. 3*a*, the fuel path through the air fuel control is illustrated by the arrows which show fuel entering the control through an inlet port 62 to an adjustable needle valve 64 through an outlet passage 68.

As further illustrated in FIG. 3*a*, an inlet bypass passage 70 is formed between the inlet port and the cavity 72 in which plunger 58 is slidably received. A bypass outlet passage 74 is formed in housing 46 between outlet passage 68 and the plunger cavity 72 to complete a variable flow path around needle valve 64. The bypass passages 70 and 74 may be formed by drilling the housing 64 from the outside. Ball bearings 76 or other plugs may be pressed into the openings 78 as illustrated in FIG. 3*a* to seal the passges.

The purpose of the structure illustrated in FIG. 3*a* is to form a restrictor for providing the proper fuel rate for the available air in the engine cylinders. When properly adjusted, a fuel air control mechanism as illustrated in FIG. 3*a* is capable of providing optimum engine response and emission control during all normal engine operating conditions wherein the pressure within the intake manifold is other than at the rated level. The air fuel control 14 operates to control the fuel rate by sensing engine intake manifold pressure and by varying the restriction in response thereto in order to modulate the fuel rate in a way to achieve optimum fuel/air ratio. Air line 16 is connected through the air line flow restriction 34 to first chamber 50 by means of air inlet passage 76. Stem valve element 56 and flexible bellows 54 are biased toward the position illustrated in FIG. 3*a* by means of a spring 78.

Thus, when the pressure of air within the intake manifold is well below its rated value, spring 78 biases stem valve 56 into the position illustrated in FIG. 3*a* to thereby close the communication path between passages 70 and 74 causing all fuel flow to pass through the fuel restriction 80 of needle valve 64. As the pressure within the intake manifold 4 increases, air is fed through air line 16, flow restriction 34, air inlet passage 76 and into the first chamber as illustrated by the arrows in FIG. 3*b*. As plunger 58 moves, the chamfer 68 begins to allow fuel to flow through plunger cavity 72 from passage 70 to passage 74 and thus bypass the fuel restriction 80. As the intake manifold air pressure increases, the plunger forms a larger flow path between passages 70 and 74 until a minimum fuel restriction level is reched and the intake manifold air pressure holds the plunger in a full fuel position, as illustrated in FIG. 3*b*.

To achieve optimum engine operation, the restrictor must be carefully calibrated since too little fuel will cause the engine to be "sluggish" and too much fuel will result in excessive use of fuel, polluting emissions and decreased power. The stem valve 56 is adjusted by lock nut 79 and threaded stem 81 described in greater detail in U.S. Pat. No. 3,945,302. As is apparent in FIGS. 3*a* and 3*b*, needle valve 64 may be adjusted by set screw 83 to vary the fuel flow during operation at low intake manifold pressures.

Normally, fuel is kept from leaking into the second chamber 52 by means of a glyd ring and expander "O" ring 82. However, because of dirt and the high pressure of the fuel supply to the air fuel control, fuel leaks can develop around seal 82 resulting in a leakage of fuel into chamber 52. In the past, such leakage has resulted in fuel leakage outside of housing 46 through the conventional vent passge 84. To avoid this problem, the vent passage 84 is sealed by a seal washer 42 and a drain passage 86, schematically illustrated in dashed lines, is formed for connection with drain line 32 which forms part of a return passage to the fuel tank of the engine. In this way, any fuel which leaks past seal 82 may be returned to the fuel tank without disturbing the operation of the air fuel control mechanism. By connecting the drain line 32 directly to the return line 18, FIG. 1, an additional benefit is derived as can be easily perceived by consideration of FIGS. 3*a* and 3*b*. In particular, should an engine user seek to increase the engine output by clamping return line 18, the back pressure created within this line will cause the same back pressure to exist within sacone chamber 52 and thus bias the stem valve 56 to the position illustrated in FIG. 3*a*. In this position, engine output power will be severely reduced since all fuel that passes to the engine must pass through fuel restriction 80.

While provision of a drain line is effective to solve the leakage problem around seal 82, an undesirable and possibly dangerous circumstance can arise should the flexible bellows member 54 be ruptured, thereby causing air from the intake manifold to be passed into second chamber 52 through drain passage 86 and into the fuel tank via return line 18. If the fuel tank vent 88 (see FIG. 1) is insufficient to handle the volume of air provided to the fuel tank through the ruptured flexible bellows 54, the fuel tank can become pressurized resulting in adverse engine operation. To avert such a situation, the flow restriction 34 is placed between the air line 16 and the air inlet passage 76 in the cover 38 of the air fuel control 14, thereby limiting the maximum possible air flow rate to an amount less than the maximum venting capacity of vent 88 of the fuel tank. The flow restriction need not impose a limitation on the operating characteristics of the air fuel control 14 since only a limited flow rate is required to cause the pressure in chamber 50 to follow the pressure in the intake manifold. Should the flexible bellows rupture, however, the flow restriction becomes operable to limit the rate at which air may pass through the ruptured bellows and into the fuel tank, thereby averting the adverse effects which would otherwise result.

While the provision of a simple flow restriction in air line 16 is suitable to avoid the adverse effect of a ruptured bellows 54 under most operating conditions, the combine effect of a ruptured bellows 54 and seal 82 leak could create a situation where fuel is forced into the intake manifold 4 via the air line 16. Obviously, such fuel injection directly into the intake manifold would be highly undesirable. Accordingly, the flow restriction illustrated in FIG. 4 is designed to avoid any possibility that a great amount of fuel will enter the air line 16 due to a simultaneous leakage of fuel around seal 82 and a rupture of flexible bellows 54. FIG. 4 discloses a cross sectional view of the cover 38 of the air fuel control 14 wherein the flow restriction 34 has been inserted into air inlet 76. In particular, the flow restriction 34 includes a hollow housing 90 connected to the cover 38 by screw threads 92. The upper end of housing 90 includes an internally threaded cavity 94 for receiving one end of air line 16. A restriction orifice 96 having a diameter of approximately 0.02 inches connects the central cavity of housing 90 with inlet passage 76 to provide a flow path between the intake manifold and the first chamber of the air control device.

One end of the hollow restriction housing 90 is closed by means of a plug 97 to form a check valve cavity 98, the upper end of which includes a check valve restriction 100. A ball 102 is disposed within the check valve cavity and has a diameter sufficiently smaller than the diameter of check valve cavity 98 as to permit air to pass from air line 16 to the first chamber of the air fuel control without imposing any greater restriction than is imposed by the restriction orifice 96. The check valve housing 90 is oriented so as to cause ball 102 to be biased toward the position illustrated in dashed lines by 104. Under normal operating conditions, the flow of air from the first chamber back to the intake manifold is never sufficient to cause the ball 102 to be moved to the closed position illustrated in dashed lines by 106. However, if fuel should leak past seal 82 and through a rupture in the flexible bellows 54, it would attempt to flow into air line 16 through the flow restriction 34. In this circumstance, the greater viscosity of the liquid fuel as compared with air would cause ball 102 to be moved to the position illustrated in 106 to thus prevent the flow of fuel into air line 16.

FIG. 5 illustrates an alternative embodiment of the flow restriction illustrated in FIG. 4 including a modified housing 108 having an internal cavity 110 formed with a tapered internal surface 112 which decreases in cross-sectional diameter in the direction toward air line 16. A screw threaded plug 114 is provided at the lower end of cavity 110 to provide an adjustable stop 116 to thereby adjustably position ball 102 in its open position relative to tapered surface 112. By this arrangement, the amount of clearance between ball 102 and tapered surface 112 may be varied by moving screw threaded plug 114 axially with respect to the cavity 110. The flow restriction assembly 34' of FIG. 5 achieves the added advantage of permitting precise adjustment of the flow rate characteristics of the check valve whereby it can be assured that the valve will not respond to normal air flow in either direction through the flow restriction assembly 34' but will immediately respond to the flow of fuel out of the first chamber 50 and into the check valve cavity 110 to cause ball 102 to be moved to its upper closed position.

The rate of fluid flow through the flow restriction assemblies of FIGS. 4 and 5 is controlled at all times by the size of orifice 96 when fluid is flowing into first chamber 50. When the flow is in the opposite direction, the flow rate is normally controlled again by the size of orifice 96 until the rate is sufficient to overcome the weight of the ball 102 and lift it to the closed position. Since manufacturing tolerances in the check valve cavity result in variations in the clearance between the ball and the cavity, it is clear that the assembly of FIG. 5 provides a decided advantage over the flow restriction design of FIG. 4. In particular, the design of FIG. 5 permits all flow restriction assemblies to be calibrated to the same precise closing characteristic regardless of manufacturing tolerances.

Of course, some fuel may reach the intake manifold as long as the fuel flow through the check valve is insufficient to move the check valve ball to its closed position. With the arrangement of FIG. 5, it is possible to calibrate the check valve to insure closure above a predetermined nominal flow rate of 60 cc per minute. As long as the fuel flow rate does not exceed this amount, no substantial damaging effect can result from a fuel leak through a ruptured flexible bellows in the air flow control 14.

FIG. 6 is a schematic illustration of an internal combustion engine which has been retrofitted with a drain line and flow restriction of the type discussed above. When retrofitting an existing engine, it is sometimes desirable to provide a flexible drain line having a connector 120 at one end for connection with the air fuel control 14 and a second connector 122 at the other end of flexible drain line 118 for connection directly to the engine fuel tank 20. Alternatively, the drain line can be provided with a connector designed for splicing into the return line of the engine such as Tee connector 36 of FIG. 2. A flow restriction 124 of the type illustrated in FIG. 4 or FIG. 5 is connected between the air fuel control and air line 16 leading to the intake manifold 4. Although not illustrated, a new cover such as illustrated in FIG. 4 is also provided on the air fuel control 14 wherein the cover is designed to receive the flow restriction 124. Similarly, a seal washer, not illustrated, may also be employed to seal the conventional vent passage of the air fuel controi. All the components required for retrofitting an existing engine having an air fuel control of the type disclosed in this invention may be assembled in kit form for use by anyone desiring to retrofit an existing engine with a drain line and flow restrictor to avoid the adverse effects created either by a plunger seal leak or a flexible bellows rupture or the adverse effects which could result from simultaneous seal leak and bellows rupture.

While a preferred embodiment of the invention has been described, it should be apparent that it may be employed in different forms without departing from its spirit and scope.

Having thus described the invention, what is claimed as novel and desired to be secured by Letters Patent of the United States is:

1. A fuel supply system for an internal combustion engine which is operationally controlled by the pressure of fuel supplied to the engine from a fuel source and which has an intake manifold for supplying air to the engine, comprising (a) air pressure responsive means for modulating mechanically the flow of fuel into the engine in response to the pressure of air within the intake manifold, said air pressure responsive means including
  (1) first and second chambers,
  (2) pressure responsive actuating means disposed between said chambers for normally preventing fluid flow between said chambers and for transforming changes in intake manifold pressure operating said air pressure responsive means, and
  (3) an air line connecting said intake manifold with said first chamber;

(b) fuel leakage drain means for returning fuel which may leak into said second chamber back to the fuel source, said fuel leakage drain means including a drain line connected to form a return path from said second chamber to the fuel source; and (c) flow restriction means connected with said air line for permitting air flow in both directions between the intake manifold and said first chamber and for preventing substantially all flow of fuel from said air pressure responsive means to the air intake manifold, whereby restriction or blockage of said drain line cannot cause substantial flow of fuel from said air pressure responsive means to the intake manifold even if said pressure responsive actuating means were to malfunction and permit fuel to flow from said second chamber into said first chamber.

2. A fuel supply system as defined in claim 1, for use with an internal combustion engine having a variable fuel air ratio dependent upon changes of air pressure within the intake manifold of greater than a first threshold level and a vented fuel source which causes engine malfunction when subjected to pressurizing air flow greater than the rate at which the air may be vented, wherein said flow restriction means includes a restricted orifice sufficient in size to permit air pressure in said first chamber to respond to changes in the pressure within the air intake manifold with sufficient speed in order to maintain the fuel/air ratio of the engine substantially within predetermined limits, said restricted orifice being sufficiently small to limit air flow from the intake manifold to the fuel supply to a rate less than the rate at which air may be vented from the fuel supply should said pressure responsive actuating means malfunction and allow air to pass from said first chamber to said second chamber and into said drain line.

3. A fuel supply system as defined in claim 2, wherein said restricted orifice is an opening having a diameter of approximately 0.02 inches.

4. A fuel supply system as defined by claim 1, wherein said flow restriction means includes a check valve responsive to fuel within said air line to close said air line to prevent fuel from flowing from said first chamber into the intake manifold.

5. A fuel supply system as defined in claim 4, wherein said check valve includes a ball normally biased toward an open position in which air may pass in both directions through said air lines but is responsive to fuel flow within said air line toward the intake manifold to cause said ball to move to a closed position to prevent fuel flow above a predetermined amount from reaching the intake manifold.

6. Fuel supply means as defined in claim 5, wherein said ball is normally biased toward said open position.

7. Fuel supply means as defined in claim 6, wherein said check valve includes a tapered section having a decreasing cross section in the direction toward the intake manifold, said tapered section cooperating with said ball to define a second restriction when said ball is in said open position, and a variable stop means for adjusting the open position of said ball to vary the size of said second restriction whereby the flow rate at which said check valve is moved to said closed position may be changed to cause said ball to be unresponsive to air flow toward the intake manifold under normal operating conditions of the engine but to close in response to fuel flow toward the intake manifold above a predetermined minimum amount.

8. A fuel supply system as defined in claim 1, wherein said pressure responsive actuating means includes a rupturable diaphram between said first and second chambers and a throttling valve connected with said diaphram and movable in response to air pressure changes in said first chamber, said throttling valve being subject to fuel leakage causing fuel to enter said second chamber and said first chamber if said diaphram is simultaneously ruptured.

9. A fuel supply system as defined by claim 2, wherein said flow restriction means includes a check valve responsive to fuel flow above a predetermined minimum within said air line to close said air line to prevent fuel from flowing from said first chamber into the intake manifold.

10. A fuel supply system as defined in claim 9, wherein said check valve includes a ball normally biased toward an open position in which air may pass in both directions through said air line but is responsive to fuel flow within said air line toward the intake manifold to cause said ball to move to a closed position to prevent fuel from reaching the intake manifold.

11. Fuel supply means as defined in claim 10, wherein said ball is normally biased toward said open position.

12. Fuel supply means as defined in claim 11, wherein said check valve includes a tapered section having a decreasing cross section in the direction toward the intake manifold, said tapered section cooperating with said ball to define a second restriction when said ball is in said open position, and a variable stop means for adjusting the open position of said ball to vary the size of said second restriction whereby the flow rate at which said check valve is moved to said closed position may be changed to cause said ball to be unresponsive to air flow toward the intake manifold under normal operating conditions of the engine but to close in response to fuel flow toward the intake manifold.

13. A fuel supply system as defined in claim 1, wherein said air pressure responsive actuating means includes a rupturable diaphram between said first and second chambers and a throttling valve connected with said diaphram and movable in response to air pressure changes in said first chamber, said throttling valve being subject to fuel leakage causing fuel to enter said second chamber and said first chamber if said diaphram is simultaneously ruptured.

14. A fuel supply system as defined in claim 1, for use with an engine having a fuel injection system in which a portion of the fuel sent to the engine by the fuel supply system is returned to the fuel source through a return line, wherein said drain line is connected to said return at a point before the fuel source.

15. A fuel supply system as defined in claim 1, for use with an engine having a fuel injection system in which a portion of the fuel sent to the engine by the fuel supply system is returned to the fuel source through a return line, wherein said drain line is connected directly to the fuel source to define a flow path entirely separate from the flow path defined by the return line.

16. A kit for preventing the damaging effects of fuel leaks in a fuel supply system for an internal combustion engine which is operationally controlled by the pressure of fuel supplied to the engine from a fuel source and which has an air intake manifold and an air pressure responsive means for modulating mechanically the flow of fuel into the engine in response to the pressure of air within the intake manifold, the air pressure responsive means including first and second chambers, pressure responsive actuating means disposed between the chambers for normally preventing fluid flow between said chambers and for transforming changes in intake manifold pressure into mechanical movement for operating the air pressure responsive means and an air line connecting the intake manifold with the first chamber, said kit comprising (a) fuel leakage drain means for returning any fuel which may leak into the second chamber back to the fuel source, said fuel leakage drain means including
  (1) a drain line,
  (2) first connector means attached to one end of said drain line for connecting said drain line to said second chamber, and
  (3) second connector means attached to the other end of said drain line for connecting said drain line into a flow path leading back to the fuel source; and (b) flow restriction means adapted to be connected with the air line for permitting air flow in both directions between the intake manifold and the first chamber and for preventing flow of fuel from the air pressure responsive means to the air intake-manifold, whereby restriction or blockage of said drain line cannot cause flow of fuel from the air responsive means to the intake manifold even if the pressure actuating means were to malfunction and permit fuel to flow from the second chamber into the first chamber.

17. A fuel supply system as defined by claim 16, wherein said flow restriction means includes a check valve responsive to fuel within said air line to close said air line to prevent fuel from flowing above a predetermined rate from said first chamber into the intake manifold.

18. A fuel supply system as defined in claim 17, wherein said check valve includes a ball normally biased toward an open position in which air may pass both directions through said air line but is responsive to fuel flow within said air line toward the intake manifold to cause said ball to move to a closed position to prevent fuel from reaching the intake manifold.

19. Fuel supply means as defined in claim 18, wherein said ball is normally biased toward said open position.

20. Fuel supply means as defined in claim 19, wherein said check valve includes a tapered section having a decreasing cross section in the direction toward the intake manifold, said tapered section cooperating with said ball to define a second restriction when said ball in said open position and a variable stop means for adjusting the open position of said ball to vary the size of said second restriction whereby the flow rate at which said check valve is moved to said closed position may be changed to cause said ball to be unresponsive to air flow toward the intake manifold under normal operating conditions of the engine but to close in response to fuel flow toward the intake manifold above a predetermined rate.

21. A fuel supply system as defined in claim 1, wherein said pressure responsive actuating means includes a rupturable diaphram between said first and second chambers and a throttling valve connected with said diaphram and movable in response to air pressure changes in said first chamber, said throttling valve being subject to fuel leakage causing fuel to enter said second chamber and said first chamber if said diaphram is simultaneously ruptured.

22. A method of preventing the damaging effects of fuel leaks in a fuel supply system for a internal combustion engine which is operationally controlled by the pressure of fuel supplied to the engine from a fuel source and which has an air intake manifold and an air pressure responsive means for modulating mechanically the flow of fuel into the engine in response to the pressure of air within the intake manifold, the air pressure responsive means including first and second chambers, pressure responsive actuating means disposed between the chambers for normally preventing fluid flow between said chambers and for transforming changes in intake manifold pressure into mechanical movement for operating the air pressure responsive means and an air line connecting the intake manifold with the first chamber, said method including the steps of (a) connecting one end of a drain line to the second chamber, (b) connecting the other end of the drain line to the fuel supply system in such a way as to form a return path for any fuel which may leak into the second chamber back to the fuel source, and (c) installing a fuel flow check valve in the air line arranged to permit flow of air in both directions between the first chamber and the intake manifold but preventing fuel flow from the air line into the intake manifold above a predetermined level.

23. A fuel supply system for use with an internal combustion engine which is operationally controlled by the pressure of fuel supplied to the engine from a fuel source and which has an intake manifold for supplying air to the engine and a vented fuel source which causes engine malfunction when subjected to pressurizing air flow greater than the rate at which the air may be vented, comprising (a) air pressure responsive means for modulating mechanically the flow of fuel into the engine in response to the pressure of air within the intake manifold, said air pressure responsive means including (1) first and second chambers, (2) pressure responsive actuating means disposed between said chambers for normally preventing fluid flow between said chambers and for modulating the flow of fuel into the engine in response to changes in intake manifold pressure, and (3) an air line connecting said intake manifold with said first chamber;

(b) fuel leakage drain means for returning fuel which may leak into said second chamber back to the fuel source, said fuel leakage drain means including a drain line connected to form a return path from said second chamber to the fuel source; and (c) flow restriction means connected with said air line for permitting air flow in both directions between the intake manifold and said first chamber, said flow restriction means includes a restricted orifice sufficient in size to permit air pressure in said first chamber to respond to changes in the pressure within the air intake manifold with sufficient speed in order to maintain the fuel/air ratio of the engine substantially within predetermined limits, said restricted orifice being sufficiently small to limit air flow from the intake manifold to the fuel supply to a rate less than the rate at which air may be vented from the fuel supply should said pressure responsive actuating means malfunction and allow air to pass from said first chamber to said second chamber and into said drain line.

* * * * *